United States Patent [19]
Engle

[11] Patent Number: 5,980,289
[45] Date of Patent: Nov. 9, 1999

[54] HOSE COUPLING WITH ELECTRICAL CONTACTS

[75] Inventor: Thomas H. Engle, Clayton, N.Y.

[73] Assignee: Westinghouse Air Brake Company, Wilmerding, Pa.

[21] Appl. No.: 08/803,261

[22] Filed: Feb. 20, 1997

[51] Int. Cl.[6] .................................................... H01R 4/60
[52] U.S. Cl. .......................................... 439/195; 439/286
[58] Field of Search ................................. 439/190, 191, 439/192, 193, 194, 35, 286, 197; 213/1.3, 76

[56] References Cited

U.S. PATENT DOCUMENTS

| 341,128 | 5/1886 | Burton | 439/195 |
| 343,515 | 6/1886 | Burton | 439/195 |
| 370,605 | 9/1887 | Carpenter | 439/195 |

Primary Examiner—Neil Abrams
Assistant Examiner—Brian J. Biggi
Attorney, Agent, or Firm—James Ray & Associates

[57] ABSTRACT

Connector for joining a fluid pressure communication conduit and an electrical communication line to a second fluid pressure communication conduit and at least a second electrical communication line. The connector has a connector body having an internal space contained within a pressure boundary, the internal space communicating with a fluid pressure connector for attachment to the first fluid pressure communication conduit, a portion of the pressure boundary including a floating member, the floating member having a fluid pressure communication port for mating with a second fluid pressure communication port on a second connector. The floating member also has one or more electrical contacts for mating with one or more electrical contacts on the second connector. The electrical contacts have electrical connection to the one or more electrical communication lines. A force due to air pressure in the internal space presses against the floating member presses the electrical contacts, thereby providing good electrical connection between the connectors.

19 Claims, 9 Drawing Sheets

HOSE COUPLING WITH ELECTRICAL CONTACTS

CROSS-REFERENCE TO RELATED APPLICATIONS

The present invention is closely related to the following co-pending application entitled "Electric Contact Arrangement for Hose Coupling", which is being filed concurrently with the present application. It is assigned to the assignee of the present invention. Additionally, the teachings in this patent application are incorporated herein by reference thereto.

FIELD OF THE INVENTION

This invention applies to a connector for both a fluid pressure conduit and an electrical connection, particularly, intended for providing electrical connections between railway cars and, most particularly, the invention applies to the addition of electrical interconnection to the standard connector for the air line of the air brake system.

BACKGROUND OF THE INVENTION

Electrical interconnections between railway vehicles may be used for numerous purposes which include voice intercom, rapid air brake application and release, power for electric lighting, control of remote locomotives, diagnostics such as information regarding hotboxes and other purposes. With the availability of modern microprocessors comes the possibility of enabling a microprocessor in a lead locomotive of a train to control the tractive power and braking of slave locomotives and communicate individually or collectively with all the cars in the train. A number of such purposes can be served with a small number of electrical connections because different functions can be accomplished by using different portions of the frequency spectrum. An example is a home intercom which sends an audio signal over the power lines of the house.

The following five United States patents relate to the art of making electrical connections between electric lines in adjacent railway cars.

U.S. Pat. No. 3,251,480, issued to K. L. DePenti et al on May 17, 1966. This patent provides a connector for automatic connection of fluid pressure conduits and electrical circuits. The connector is located underneath the coupler and joining of the connectors is intended to occur automatically as the cars are coupled. This system is inconsistent with the industry standard brake line fluid pressure connector.

U.S. Pat. No. 3,646,498, issued to R. T. Reed et al on Feb. 29, 1972. This is an electrical connector which is not associated with a fluid pressure connector. Electrical contacts are embedded in insulating blocks and are brought into electrical contact by pins activated when the connectors are joined.

U.S. Pat. No. 3,773,186, issued to W. H. Reno et al on Nov. 20, 1973. This patent has contacts in bores which are placed in electrical contact by fluid pressure.

U.S. Pat. No. 3,812,444, issued to W. H. Reno on May 21, 1974. This is a combined fluid pressure connector and electrical connector which is inconsistent with the industry standard brake line fluid pressure connector.

U.S Pat. No. 5,586,668, issued to Craig A. Miller. This patent is assigned to the assignee of the present invention. It provides an integrated air and electrical connector which is consistent with the industry standard brake air connector. In this invention, the electrical contacts are pressed against each other by resilient biasing members. The teachings of this patent are incorporated herein by reference thereto.

SUMMARY OF THE INVENTION

The present invention provides a connector for joining a first fluid pressure communication conduit and at least one first electrical communication line to a second fluid pressure communication conduit and at least a second electrical communication line. The connector has a connector body having an internal space contained within a pressure boundary, the internal space communicating with a fluid pressure connector for attachment to the first fluid pressure communication conduit, a portion of the pressure boundary including a floating member, the floating member having a fluid pressure communication port for mating with a second fluid pressure communication port on a second connector. The floating member also has one or more electrical contacts for mating with one or more electrical contacts on the second connector. The electrical contacts have electrical connection to the one or more electrical communication lines. A force due to air pressure in the internal space pressing against the floating member is at least in part communicated to the one or more electrical contacts to press them against the one or more electrical contacts on the second connector, thereby providing good electrical connection between the connectors.

OBJECTS OF THE INVENTION

It is, therefore, one of the primary objects of the present invention to provide a brake line fluid connector which additionally provides connection for one or more electrical connection.

It is also one of the primary objects of the present invention to provide a brake line fluid connector which additionally provides connection for one or more electrical connection and which is consistent with the industry standard "gladhand" which is used to connect the brake air lines of coupled railway vehicles.

Still another object of the present invention is to provide a combined pneumatic and electrical connector in which air pressure carried by the pneumatic pathway is used to press the electrical connectors into contact with each to provide improved electrical contact.

It is an additional object of the present invention to provide a combined pneumatic and electrical connector in which air pressure carried by the pneumatic pathway is used to press against a large surface which presses against the seal which connects the couplers and the electrical contacts, thereby obtaining a large compressive force for joining the seals and electric contacts of two coupled connectors.

Yet another object of the present invention is to provide combined pneumatic and electrical connectors which are joined by the same motions as the present industry standard gladhand and which pull apart, as do the present connectors, when cars are separated.

A further object of the present invention is to provide a combined pneumatic and electrical connector for use in railway vehicles in which the electrical contacts are reliable enough to reliably carry an electrical current down the full length of a modern freight train.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
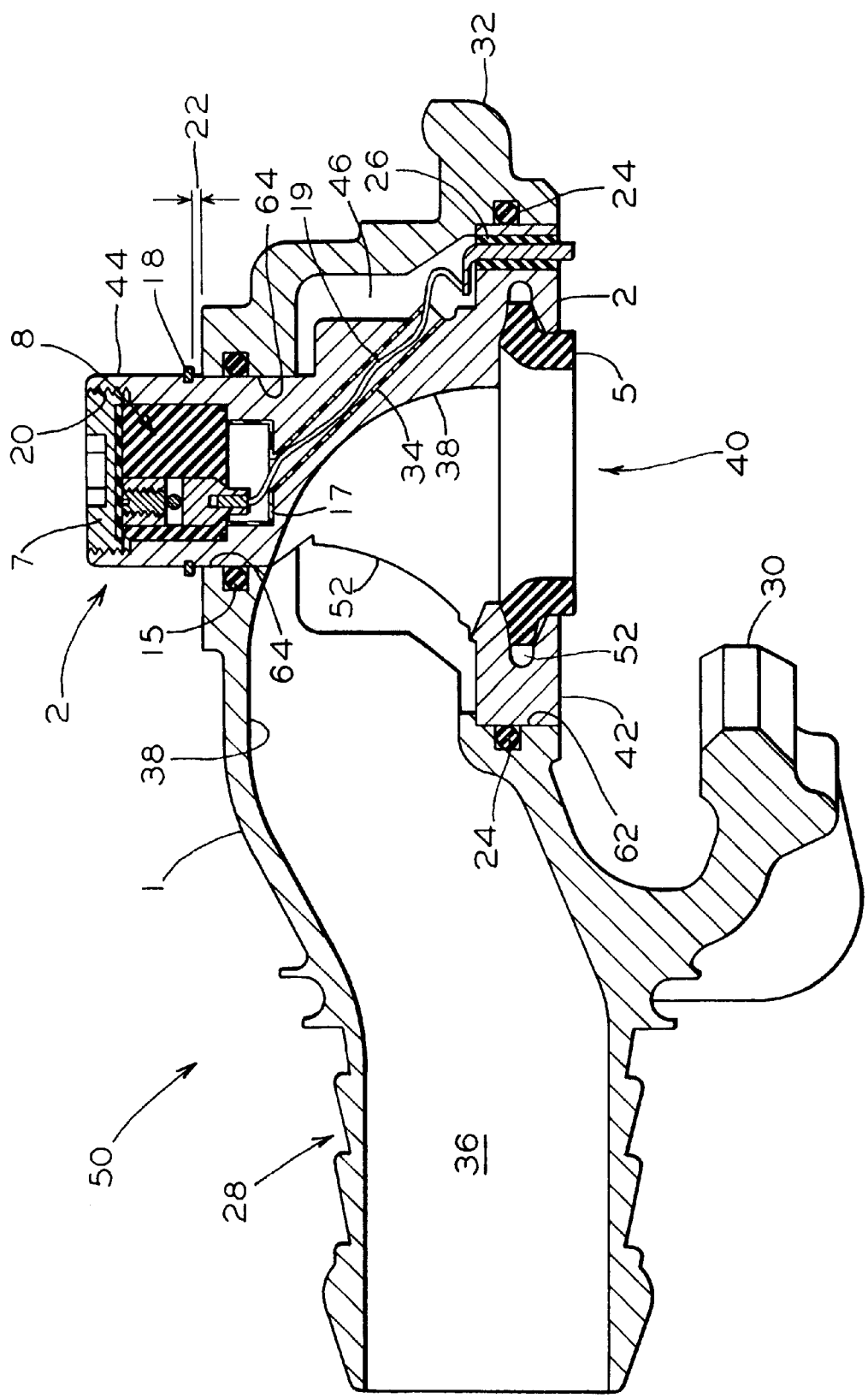
FIG. 1 is a sectional view of an electropneumatic gladhand according to the present invention.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures, for the sake of clarity and understanding of the invention.

FIG. 1 shows the presently most preferred embodiment of the present invention. Electropneumatic connector 50 has a cast body 1 which conforms to standards of the American Association of Railroads for brakeline air hose connectors. It has nipple 28 for attachment of the brakeline air hose and arcuate flanges 30 and 32 for attachment to a similar connector. It has compressible sealing means 5 surrounding air pressure communication port 40 for mating with a similar air pressure communication port on a similar connector. Flowpath 36, contained within flow boundary 38, carries air from nipple 28 to air pressure communication port 40. Two identical connectors 50 are mechanically joined by engagement of arcuate flanges 30 and 32. Flange 30 on one connector engages flange 32 on a second connector and flange 32 on the first connector engages flange 30 on the second connector. Sealing means 5 on the first connector is pressed against identical sealing means on the other connector. Both connectors are compressed and provide an air tight seal between connectors. Flanges 30 and 32, as well as seal 5 and air pressure communication port 40 are identical to those on the industry standard air hose connector. As in the conventional air hose connector, seal 5 is mounted in circumferential groove 52.

Most of the novel features of the instant invention are contained in insert 2, which is inserted into cast body 1. Cast body 1 has a first cylindrical port 62 and a second cylindrical port 64 Seal 24 is an O-ring which prevents loss of air between first cylindrical port 62 and a first portion 42 of insert 2 which is formed as a piston. Likewise seal 15 is an O-ring preventing loss of air between the second portion 44 of insert 2 which is formed as a piston and second cylindrical port 64. The entirety of insert 2 floats and is pressed downward (as shown in FIG. 1 ) by air pressure in passage 36, which also communicates with space 46. Hence, insert 2 on one connector is pressed against a similar insert on a second connector to which the first connector is joined.

Figure 2A:
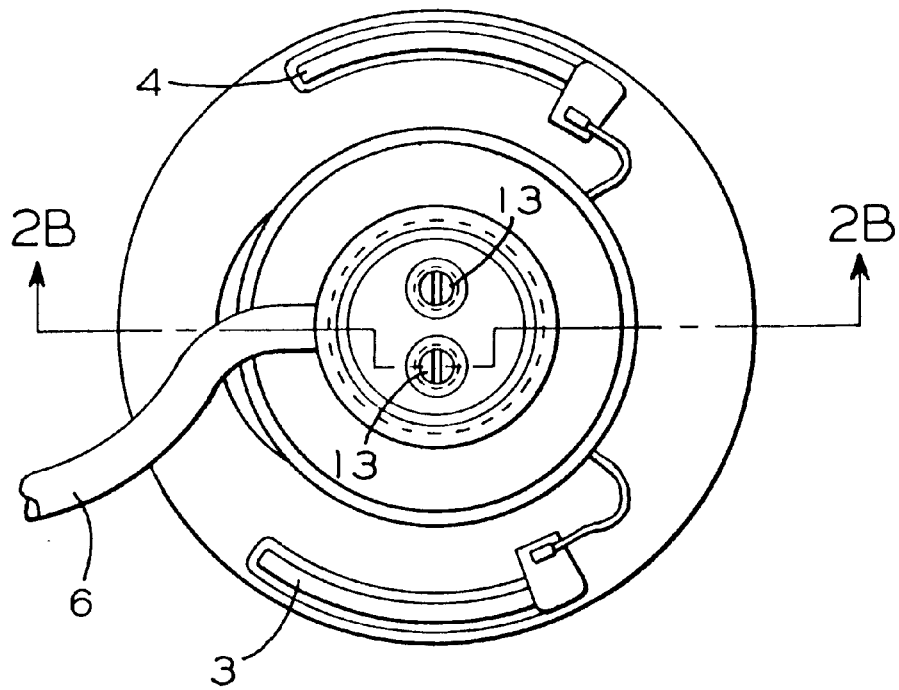
FIG. 2A shows a top view of a floating insert which is part of the connector of the present invention.
Figure 2B:
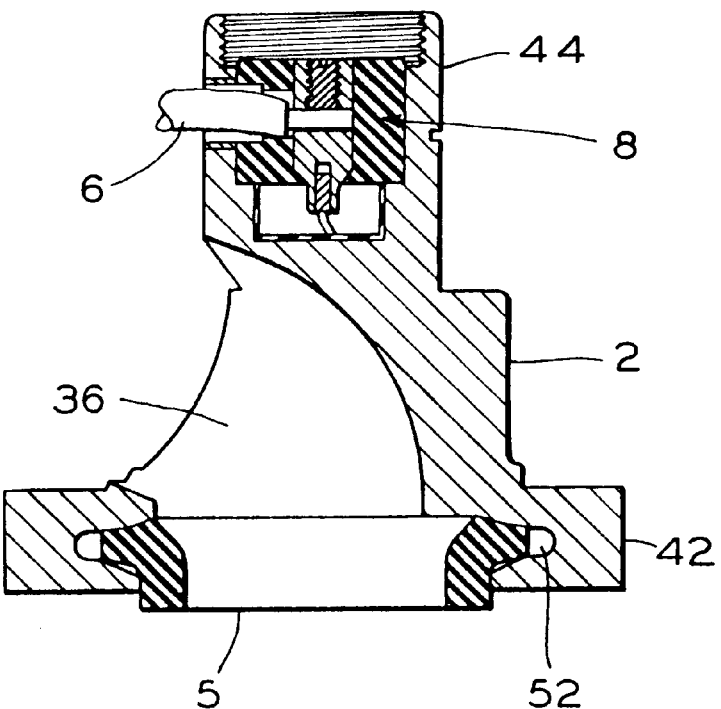
FIG. 2B shows a vertical section of the insert.
Figure 2C:
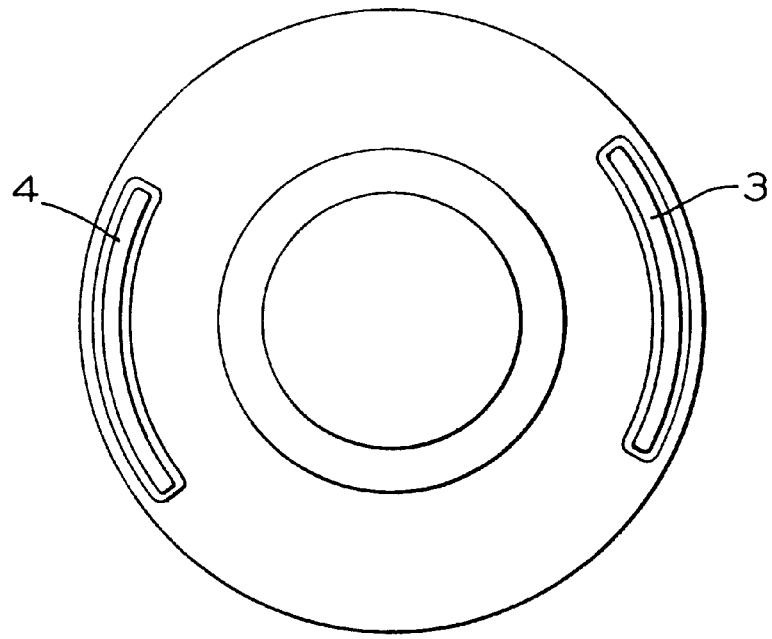
FIG. 2C is a bottom view of the insert showing a pair of arcuate electrical contacts.
Figure 2D:
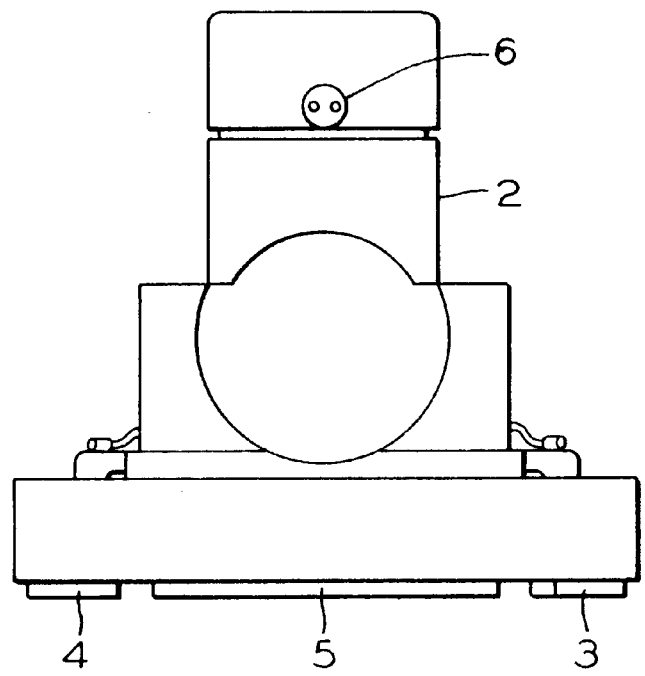
FIG. 2D is a view of the electropneumatic gladhand viewed from about parallel to the nipple of the gladhand.

All are electrical portions of the either included in or are attached to insert 2, which is best seen in FIGS. 2A,2B,2C and 2D. These show the electrical parts in proper orientation. The drawing of insert 2, shown in FIG. 1, has been rotated approximately 90 degrees to show an insulated non-chafing pathway 34 which carries conducting segment 19 to electrical contacts 3 and 4, which are best seen in FIGS. 2A, 2C and 2D. Insulation on contacts 3 and 4 is best seen as 26, in FIG. 1. Most of the force caused by air pressure pressing downward on insert 2 is borne by electrical contacts 3 and 4. Electrical contacts 3 and 4 on one connector are pressed by the force on insert 2 against similar electrical contacts on a second connector, connected to the first connector. This large contact force provides for reliable electrical contact between adjacent contacts on mated connectors.

The two conducting segments 19 are each attached to one of the two bronze terminals 12, which are molded into terminal block assembly 8. Each of the two bronze terminals 12 is drilled horizontally to receive a stripped end 48 of a single electrical conductor 16. The two single conductors 16 are obtained from a conductor cable 6. Bronze terminals 12 are also drilled vertically to accommodate terminal binding screws 13, which hold stripped ends 48 of conductors 16. Cable 6 is protected from chafing by anti-chafing bushing 11 where it penetrates second portion 44 of insert 2. Insulating cover 9 provides insulation for terminal binding screws 13. The second portion 44 of insert 2 has internal threading 20 for attachment to closure cap 7. Closure cap 7 and insulating cover 9 are removed in FIG. 2A so that terminal binding screws 13 can be seen.

Figure 3A:
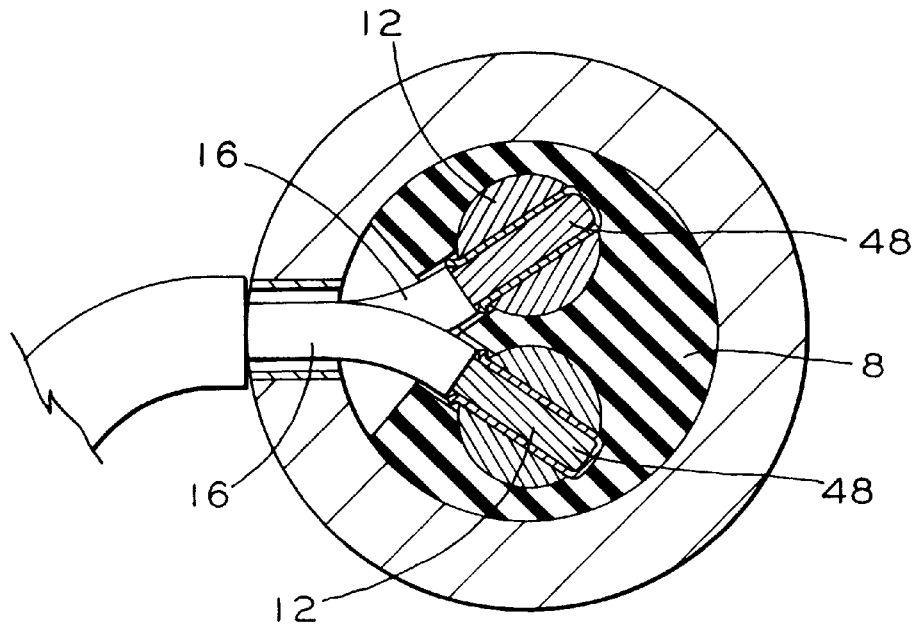
FIG. 3A is a top view of the insert showing connections for two conductors.
Figure 3B:
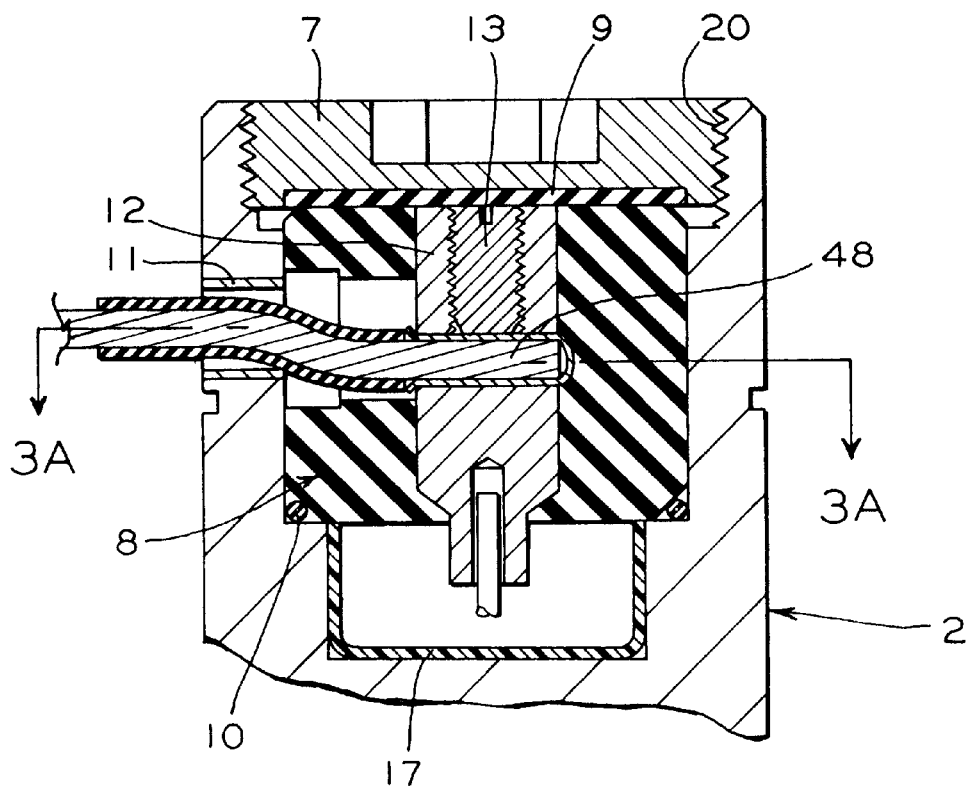
FIG. 3B shows a vertical section of the upper portion of the insert.

Static seal 10, shown in FIG. 3B, is an O-ring which prevents loss of air between terminal block assembly 8 and second portion 44 of insert 2. Chamber 17 is an insulating non-chafing chamber connected to the two insulating non-chafing passages 34 to provide pathways for conducting segments 19.

Downward motion of insert 2 is limited by external snap ring 18. This is done to retain insert 2 when connector 50 is not joined to another connector and also to facilitate joining of two connectors. The maximum allowed downward travel is denoted 22, in FIG. 1. This allowed travel provides for wear of contacts 3 and 4.

Electropneumatic connector 50 is built to be connectable to the standard all-pneumatic brakeline connector. It would, in that case, not provide for electrical connection. It should be noted that irregular line 52, seen in FIG. 1, does not indicate a cut away drawing. Rather, it is a projection of the boundary of insert 2, formed in the manner shown to provide a smooth pathway 36 from nipple 28 to air pressure communication port 40.

Figure 4A:
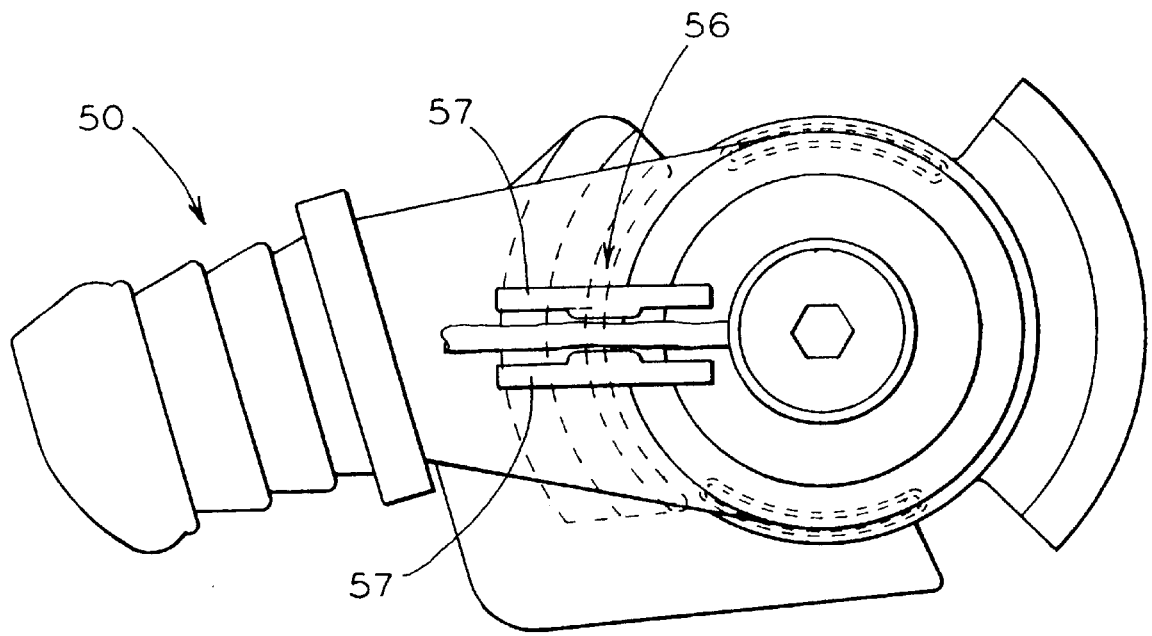
FIG. 4A shows a top view of the gladhand with protection lugs to protect the conductor.
Figure 4B:
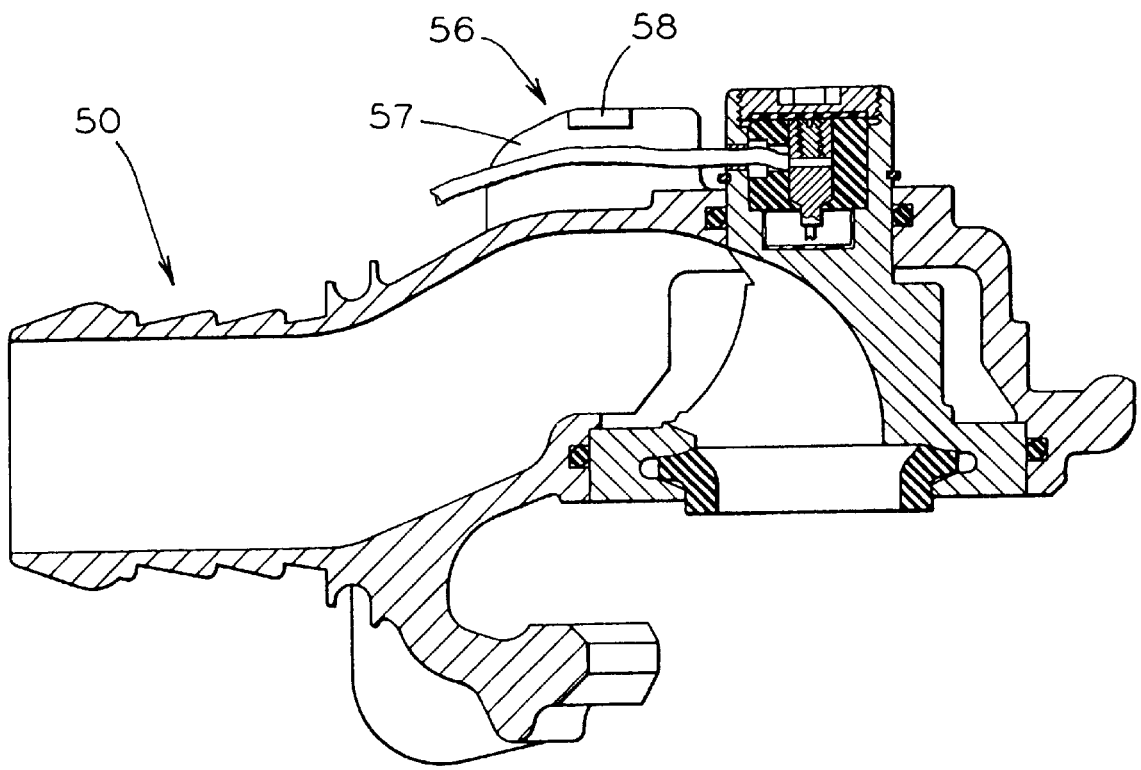
FIG. 4B is a sectional view of the gladhand with protection lugs to protect the conductor.

FIGS. 4A and 4B show electropneumatic connector 50 having an added feature 56 which protects the electrical cable 6 from mechanical harm which may occur due to rapid motion due to reaction force caused by air escaping from the gladhand when it is disconnected while under pressure.

Items 57 are lugs disposed on each side of cable 6 to protect it. Cable 6 is snapped into position through snap portion 58.

Figure 5:
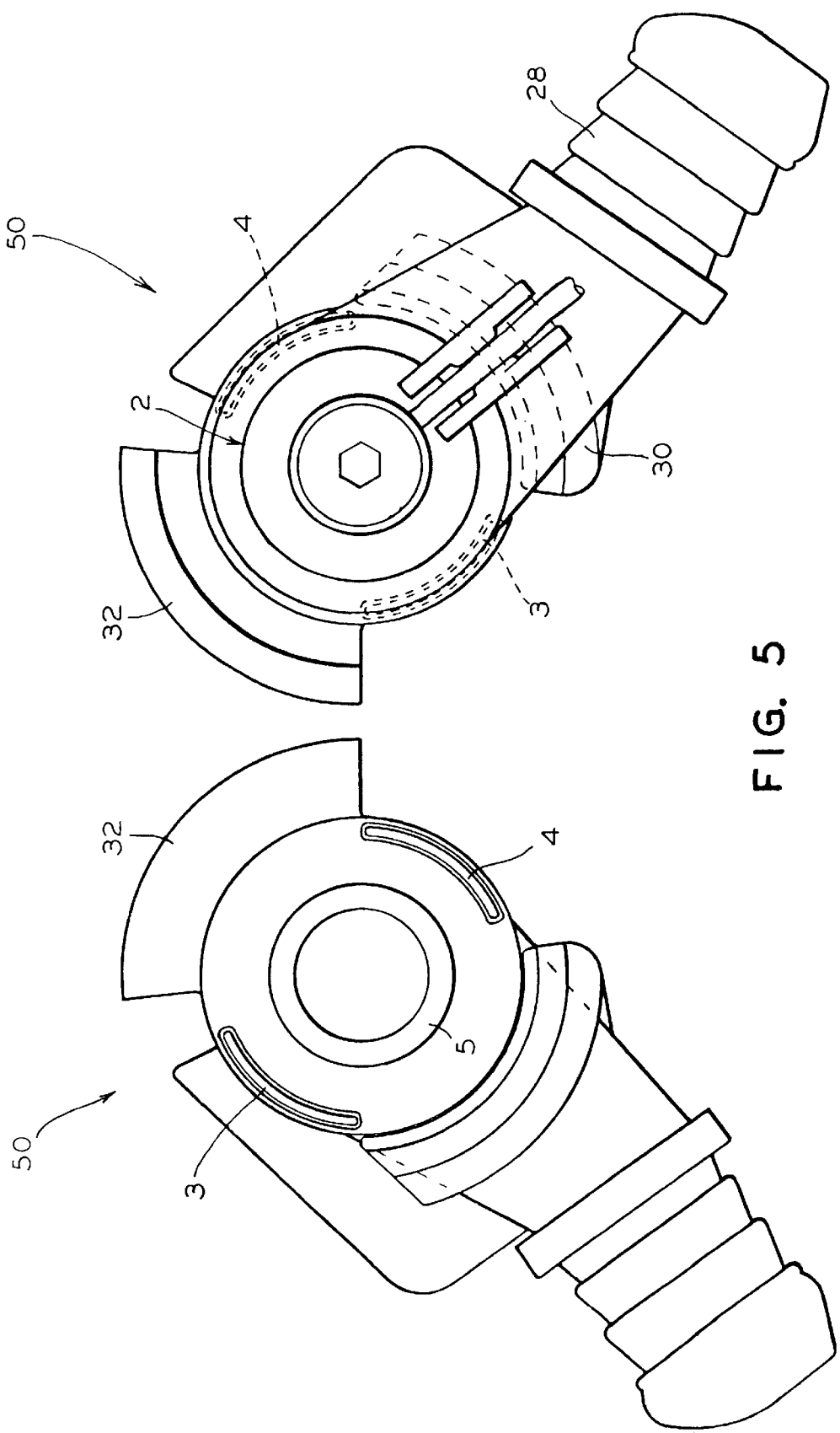
FIG. 5 shows a pair of gladhands in position for coupling.
Figure 6:
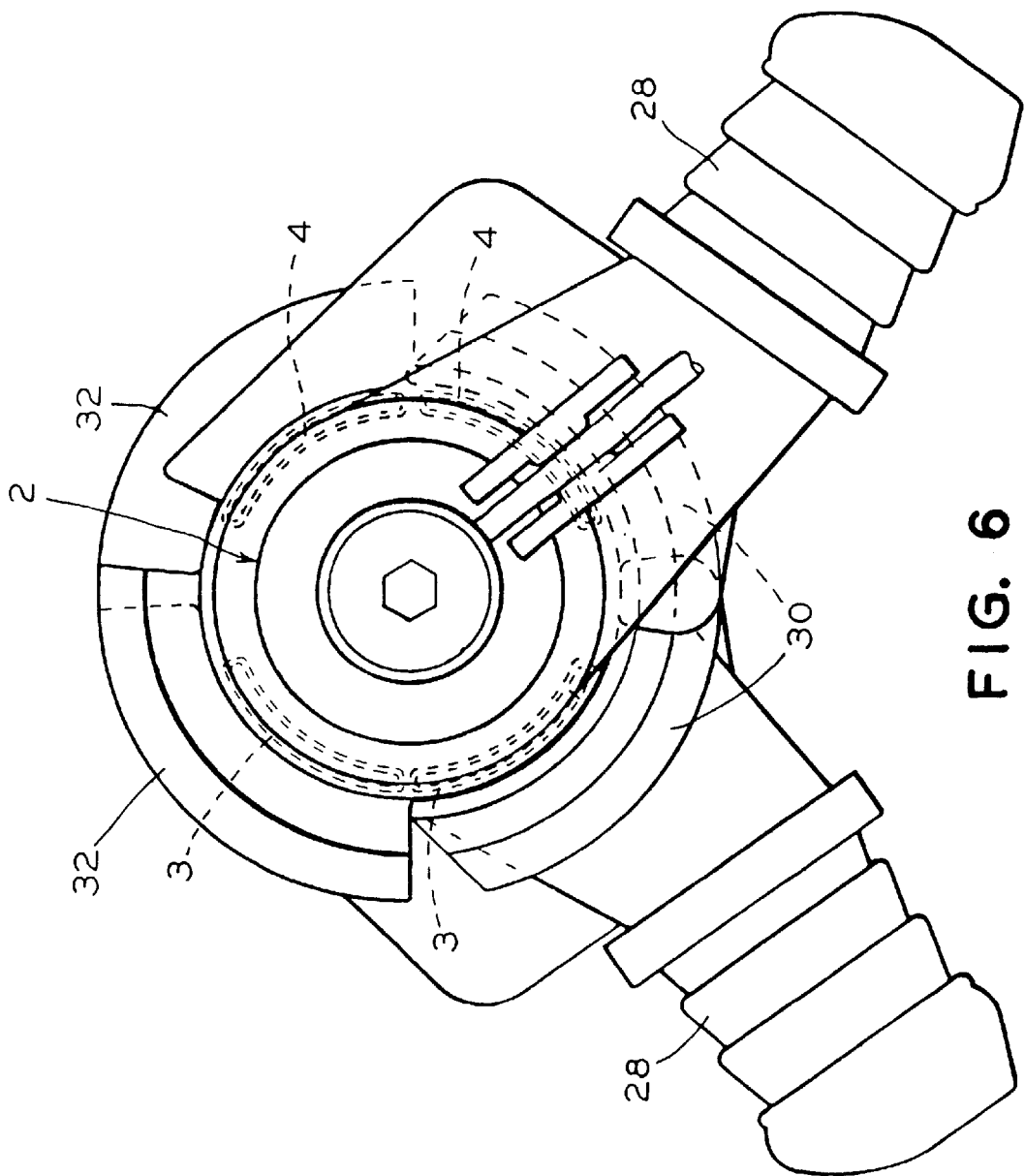
FIG. 6 shows the pair at the beginning of engagement, before the contacts meet.
Figure 7:
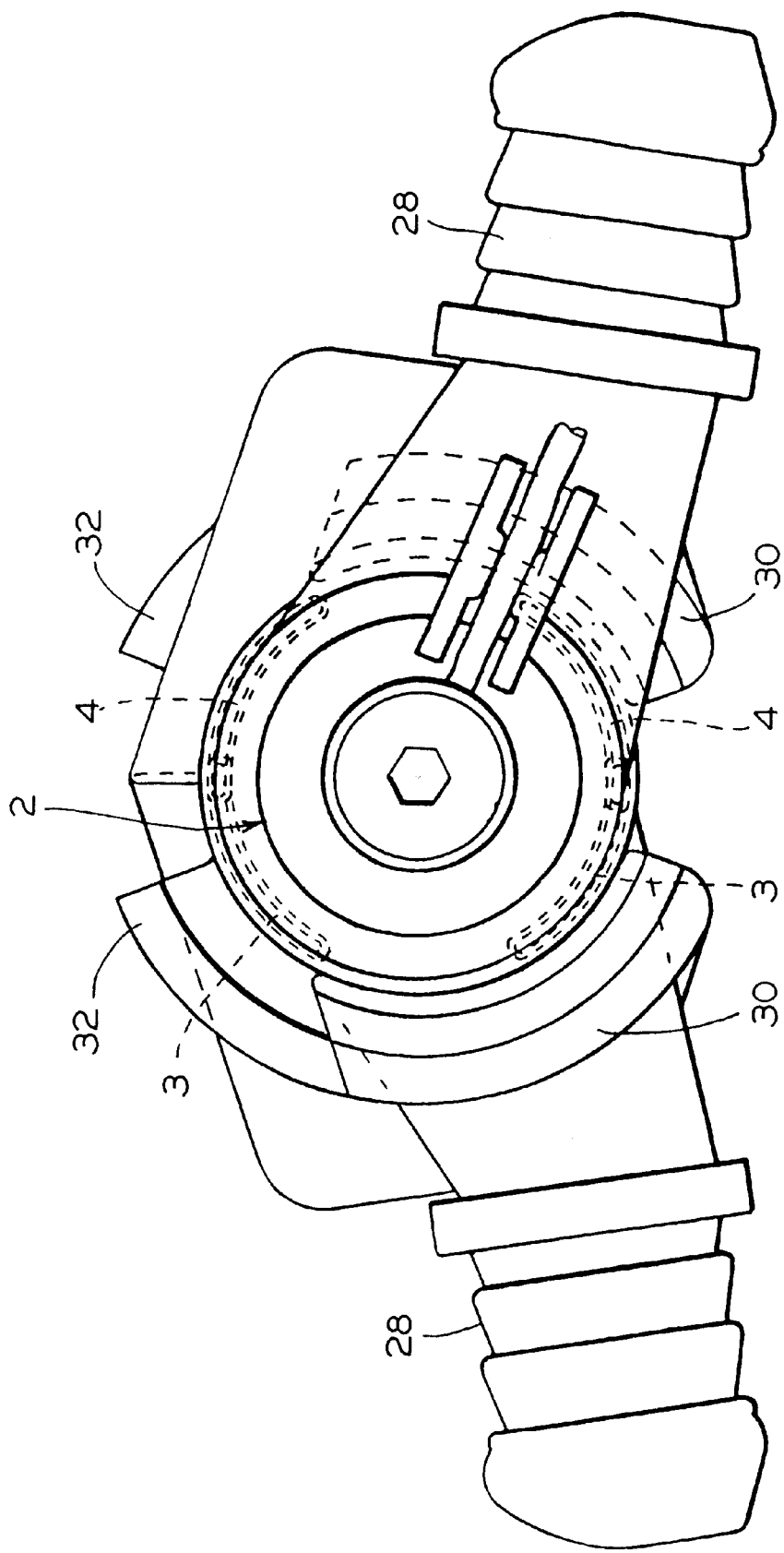
FIG. 7 shows the pair at the beginning of engagement, when the contacts are also beginning to make contact.
Figure 8:
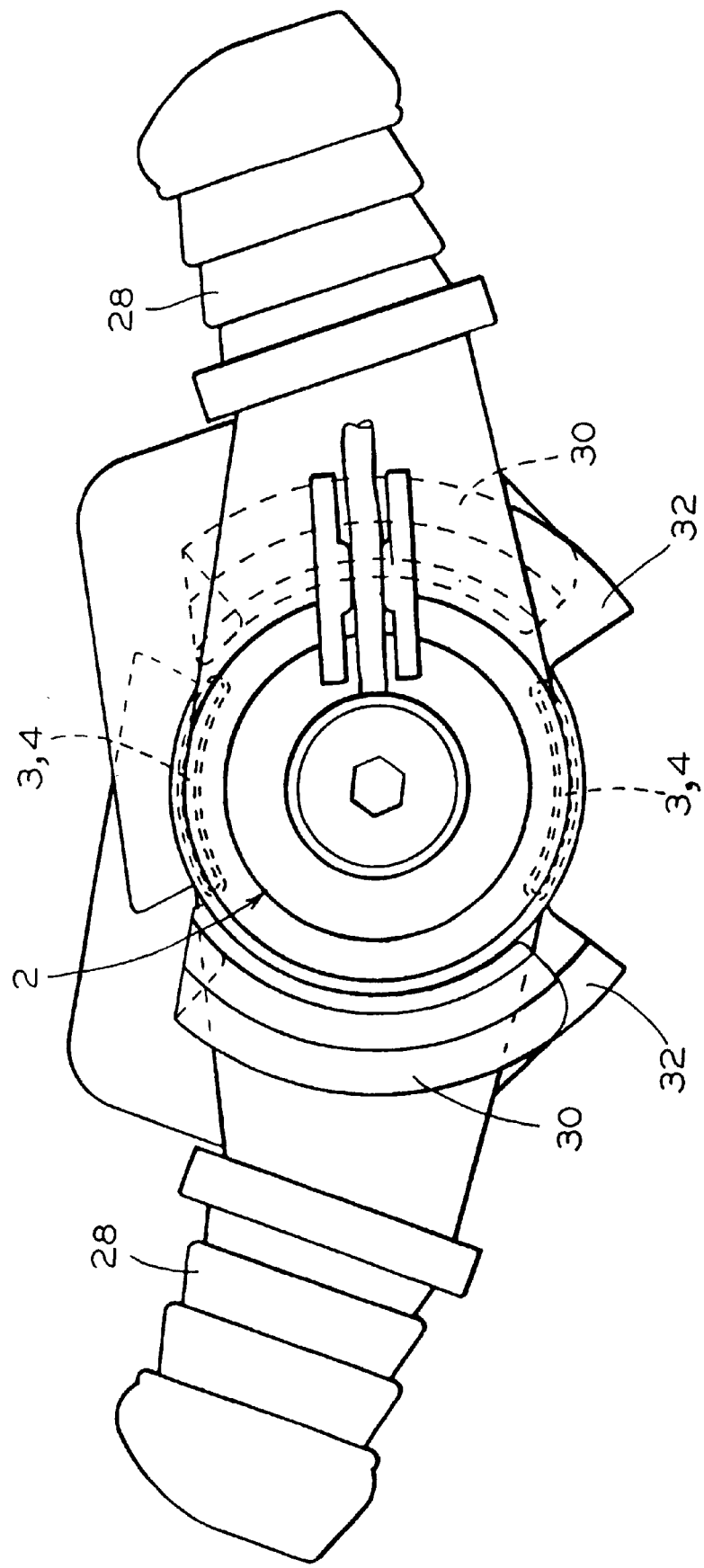
FIG. 8 shows the gladhands oriented for maximum engagement.

FIG. 5 shows a pair of gladhands in position for coupling and FIG. 6 shows them at the beginning of engagement, before the contacts meet. FIG. 7 shows the pair at the beginning of engagement, when the contacts are also beginning to make contact. FIG. 8 shows the contacts oriented for maximum engagement.

Typical forces exerted on electrical contacts 3 and 4 are calculated as follows: It is assumed that the lower diameter of insert 2 is 2.68 inches and that the upper diameter is 1 inch. The port diameter is 1.12 inches. Hence, the effect area for pressure to act on is pi/4*(2.68*2.68−1.12*1.12−1). This equals 3.87 square inches. Thus, at a nominal 75 psi of brakepipe pressure, the force is 75*3.87=290 pounds. A portion of this is borne by seal 5, but most of it is borne by contacts 3 and 4, so the contacts may each carry a force of about 100 pounds.

The force with which the contacts are pressed together may be sufficient to prevent rubbing due to changes in relative angle of two mated gladhands as the hoses go alternately taught and then slack due to curves in the track. This may be facilitated by providing alternate raised and lowered regions of the contacting surfaces of contacts 3 and 4, so that the gladhands will find a relative angle having a relatively low energy and remain in fixed angular relationship.

Many other applications of the present invention are possible. The number of electrical contacts which are mounted on a floating insert, such as 2, can be quite large, thus providing connection for a large number of circuits.

The connectors do not have to be joined by the arcuate flanges 30 and 32, but rather can be connected by many other means, including clamps, screws, springs, etc. The invention can be used on connectors which are not hermaphroditic. The invention is not confined to the connection of hoses, but could also be used to connect to a fluid pressure passage in a casting or flowblock. The fluid need not be air, but any liquid or gas which is not a good conductor of electricity. It could be used with a liquid which does conduct electricity if the conducting segments 19 and the upper portions of contacts 3 and 4 are properly insulated.

The invention could be used with hydraulic fluid. One application would be to have a hydraulic hose with an associated electrical line. The hose would be used to power a hydraulic power unit, such as a hydraulic cylinder, and the electric line would carry back a feedback signal from a sensor indicating the effect of the power unit.

Now, discussing the invention more broadly, the present invention provides a connector for joining a first fluid pressure communication conduit, such as, for example, a brake air line and at least one first electrical communication line to a second fluid pressure communication conduit and at least a second electrical communication line. The connector has a connector body having an internal space contained within a pressure boundary, the internal space communicating with a fluid pressure connector for attachment to the first fluid pressure communication conduit, a portion of the pressure boundary including a floating member, the floating member having a fluid pressure communication port for mating with a second fluid pressure communication port on a second connector. The floating member also has one or more electrical contacts for mating with one or more electrical contacts on the second connector. The electrical contacts have electrical connection to the one or more electrical communication lines, which are generally external to the device. A force due to air pressure in the internal space pressing against the floating member is at least in part communicated to the one or more electrical contacts to press them against the one or more electrical contacts on the second connector, thereby providing good electrical connection between the connectors.

The connector may have a compressible seal surrounding the fluid pressure communication port to prevent loss of fluid. The compressible seal may be formed of a material such as rubber which has some resiliency so the connector can repeatedly be joined to other connectors without the seal becoming permanently deformed and ineffective.

The seal may be formed as a ring with an external flange which is mounted in a circumferential groove around the fluid pressure communication port in the floating member, whereby the compressible seal is joined to floating member.

The floating member may have a portion formed as a piston, in which case the connector body has a cylindrical port in which the piston is slidably disposed, the piston and the cylindrical port having a diameter greater than a diameter of the fluid pressure communication port.

The fluid pressure connection of this invention may have a second seal to prevent leakage between the floating member and the connector body.

If the floating member has a portion formed as a piston, as cited above, the second seal may be a piston ring placed between the floating member and the cylindrical port. The second seal may be an O-ring made of a compressible material.

The electrical connection to an external electrical communication line may pass through a pressure boundary of the connector body and be sealed to prevent loss of fluid.

The electrical connection to an external electrical communication line may include a first conducting segment connected to a junction to which the one or more electrical communication lines are attached.

The floating member may have a second portion formed as a second piston, in which case, the connector body is formed with a second cylindrical port. The axis of the second piston and the second cylindrical port must be parallel to the axis of the first piston and the first cylindrical port. The diameter of the second piston and the second cylindrical port should be much smaller than the diameter of the first piston and the first cylindrical port.

The terminal may be attached to the floating member and may be connected to the one or more external electrical communication lines by a first connecting segment connecting the electrical contact to the terminal, an end portion of the one or more external communication lines entering the floating member at a point on the portion formed as a second piston of the floating member which is outside of the pressure boundary.

The second piston may have an access port for access to the terminal and it may have a removable access port cover.

The connector may have means for limiting a motion of the floating member, which may be an external snap ring mounted in a circumferential groove on a portion of the second piston outside of the pressure boundary.

The connector further may have a mechanical attachment means for attaching the connector to a second connector to which it is mated.

The connector may be formed as a hermaphroditic connector so that the connector may be mated with an identical second connector.

The connector may conform to railroad industry standards for brake airline connectors, so that railway vehicles having connectors according to the invention may be mated with standard brakeline connectors on adjacent railway vehicles to provide pneumatic connection between brakelines on the railway vehicles.

The connector may have attachment means which conducts electricity and a ground connection may be made by attaching ground conductors to the attachment means.

One or more of the electrical contacts of this invention may have an arcuate form centered about the center of the fluid pressure communication port.

The connector may have a pair of electrical contacts which are placed on opposite sides of the fluid pressure communication port.

While the presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

I claim:

1. A connector, here designated a first connector, for joining a first fluid pressure communication conduit and at least one first electrical communication line to a second fluid pressure communication conduit and a second at least one electrical communication line, said first connector comprising:
   a connector body having a fluid pressure connector for attachment to said first fluid pressure communication conduit;
   a floating insert at least partially disposed within said connector body, said floating insert having a first portion formed as a piston, said first portion formed as a piston being sealed against a first cylindrical port in said connector body to prevent fluid loss from said first connector, said floating insert having a first fluid pressure communication port for mating with a second fluid pressure communication port on a second connector, said floating insert further having a first at least one electrical contact for mating with a second at least one electrical contact on said second connector, said first at least one electrical contact having at least one electrical connection to said first at least one electrical communication line;
   a force on said floating insert due to air pressure in said connector body being at least in part communicated to said first at least one electrical contact to press said first at least one electrical contact against said second at least one electrical contact on said second connector, thereby providing good electrical connection between said first at least one electrical contact and said second at least one electrical contact.

2. A connector according to claim 1 having a compressible seal surrounding said first fluid pressure communication port to prevent loss of fluid.

3. A connector according to claim 2 wherein said compressible seal is made of a resilient material.

4. A connector according to claim 2 wherein said compressible seal is formed as a ring having an external circumferential flange and said floating insert has a circumferential groove surrounding said first fluid pressure communication port whereby said compressible seal is mounted on said floating insert.

5. A connector according to claim 1 wherein a piston ring is disposed between said first portion formed as a piston and said first cylindrical port to prevent leakage of such fluid between said first portion formed as a piston and said first cylindrical port.

6. A connector according to claim 5 wherein said piston ring is an O-ring formed of a compressible material.

7. A connector according to claim 1 wherein said electrical connection is a first conducting segment connected to a terminal to which said at least one first electrical communication line is attached.

8. A connector according to claim 7 wherein said floating insert has a second portion formed as a piston and said connector body has a second cylindrical port, an axis of said second portion formed as a piston and said second cylindrical port being parallel to an axis of said first portion formed as a piston and said first cylindrical port, a diameter of said second portion formed as a piston and said second cylindrical port being smaller than a diameter of said first portion formed as a piston and said first cylindrical port, said terminal being attached to said floating insert, connection to said at least one first electrical communication line being provided by a first connecting segment connecting said first at least one electrical contact to said terminal, and said at least one first electrical communication line being attached to said terminal.

9. A connector according to claim 8 wherein said second portion formed as a piston has an access port for access to said terminal and a removable access port cover.

10. A connector according to claim 8 wherein said connector has means for limiting a motion of said floating insert.

11. A connector according to claim 10 wherein said means for limiting a motion of said floating insert is an external snap ring disposed in a circumferential groove on an outside surface of said second portion formed as a piston.

12. A connector according to claim 8 wherein an O-ring is disposed between said second portion formed as a piston and said second cylindrical port to prevent leakage of fluid between said second portion formed as a piston and said second cylindrical port.

13. A connector according to claim 1 further having an attachment means for attaching said first connector to said second connector.

14. A connector according to claim 13 formed as a hermaphroditic connector so that said connector may be mated with an identical second connector.

15. A connector according to claim 14 which conforms to railroad industry standards for brakeline connectors, so that railway vehicles having connectors according to claim 14 may be mated with standard brakeline connectors on adjacent railway vehicles to provide pneumatic connection between brakelines on said railway vehicles.

16. A connector according to claim 15 having additionally a device for protecting said electrical communication line from mechanical harm caused by rapid motion of the connector when it is disconnected from another connector under pressure, due to reaction of the escaping air.

17. A connector according to claim 13 further wherein said attachment means conducts electricity, said connector having a first ground conductor attached to said attachment means to provide a ground connection to a second ground conductor attached to attachment means on said second connector.

18. A connector according to claim 1 wherein said first at least one electrical contact has an arcuate form centered about a center of said first fluid pressure communication port.

19. A connector according to claim 1 wherein said first at least one electrical contact is two electrical contacts disposed on opposite sides of said first fluid pressure communication port.

* * * * *